(12) United States Patent
Fischer et al.

(10) Patent No.: US 7,099,055 B1
(45) Date of Patent: Aug. 29, 2006

(54) FILM SCANNER WITH FILM WEAVER CORRECTION FACILITY

(75) Inventors: Dieter Fischer, Mühltal (DE); Guido Kohlmeyer, Dortmund (DE); Thomas Leonard, Schwerte (DE)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/286,117

(22) Filed: Apr. 2, 1999

(30) Foreign Application Priority Data

Apr. 3, 1998 (DE) .......................................... 198 15 066

(51) Int. Cl.
*H04N 1/04* (2006.01)

(52) U.S. Cl. ............................ 358/487; 348/97; 348/96

(58) Field of Classification Search .................. 358/487, 358/506, 500, 471, 474, 496, 498, 501; 348/97, 348/96; 355/41; 382/312, 313, 318, 319; 250/234–236

See application file for complete search history.

(56) References Cited

U.S. PATENT DOCUMENTS 4,903,131 A * 2/1990 Lingemann et al. .......... 348/97
5,527,199 A   6/1996 Feder et al. .................. 445/49

FOREIGN PATENT DOCUMENTS

| DE | 1016848    | 10/1957 |
| EP | 0222455 A1 | 5/1987  |
| EP | 0550878 A1 | 7/1993  |
| EP | 0579313 A1 | 1/1994  |
| EP | 0764970 A2 | 3/1997  |

* cited by examiner

*Primary Examiner*—Cheukfan Lee
(74) *Attorney, Agent, or Firm*—Joseph J. Laks; Francis A. Davenport

(57) ABSTRACT

The invention realtes to a film scanner comprising a frame sensor (4) for picking up film frames, and a scanning device (13) at least for scanning a sprocket hole associated with a film frame. To determine the position of a sprocket hole, the film scanner comprises an evaluation device (25) which is provided to determine, in given areas, edge positions in a measuring frame supplied by the scanning device (13), form lines from the determined edge positions and determine the deviation of the center of the sprocket hole from a reference center.

9 Claims, 4 Drawing Sheets

FILM SCANNER WITH FILM WEAVER CORRECTION FACILITY

Figure 1:
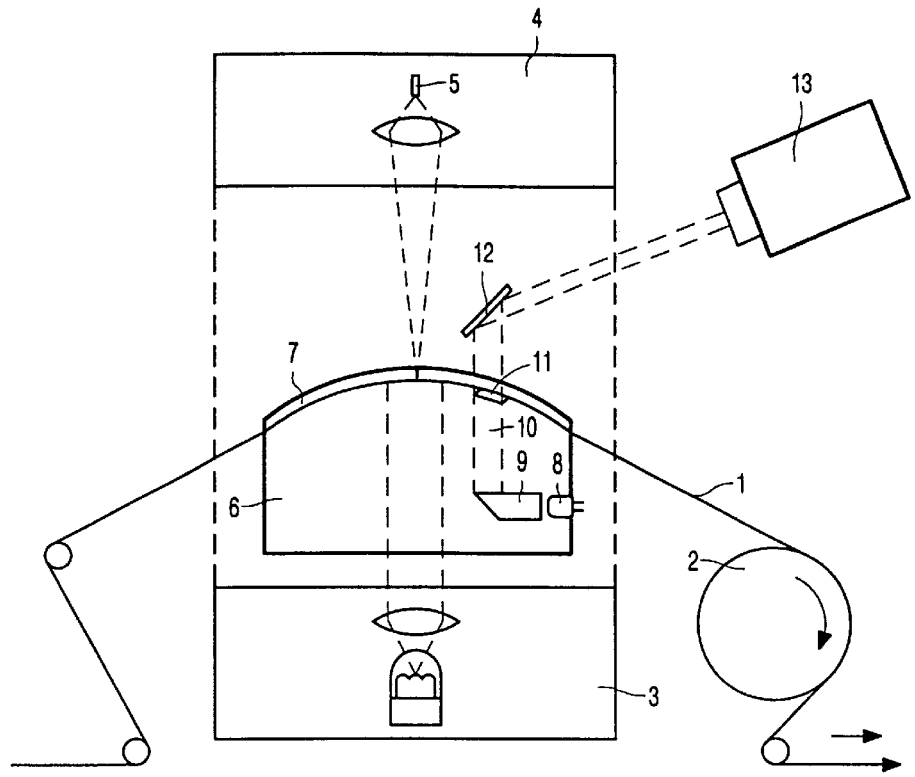

The invention relates to a film scanner comprising a frame sensor for picking up film frames, and a scanning device at least for scanning a sprocket hole associated with a film frame.

To convert cinematographic film material into electronic signals, a film is passed along or through an opto-electronic scanning device in a film scanner. This poses the long-standing problem of maintaining the frame position of successively scanned frames constant. The partly periodical, partly statistical fluctuations of the frame position, referred to as film weave, or steadiness errors, may have different causes. On the one hand, positioning errors, both in the pick-up camera and in the negative/positive copying machine may be concerned. On the other hand, frame position errors and trackings errors of the film scanner may lead to further steadiness errors.

There are different solutions to reducing steadiness errors, for which it is known, inter alia, from DE 37 36 789 C2 to scan a sprocket hole associated with a film frame as a reference point for each scanned film frame. A scanning device, for example a line sensor, which is arranged at a certain angle of inclination with respect to the film drive direction, generates pulsatory signals which are compared with stored reference patterns. In a computing circuit, the horizontal and vertical offsets of the respective scanned sprocket hole are determined as horizontal and vertical vector signals from the temporal offset of the currently scanned pulsatory signal with respect to the stored reference pattern. These vector signals are applied to a correction circuit in which the scanned film frame is moved in the opposite direction in accordance with the measured horizontal and vertical offset of the sprocket hole. The use of sprocket holes as reference points for the film frames has the advantage that mechanically conditioned positioning errors of the film can be substantially compensated, because the positions of the scanned sprocket hole and the associated film frame are coupled together, generally with a very small tolerance.

However, determining the position of a sprocket hole in accordance with the prior art presupposes that the geometry of a scanned sprocket hole corresponds possibly exactly to the reference pattern. Damage or dirt of the sprocket holes is only averaged and inevitably leads to erroneous film weave correction, particularly with fortuitous errors.

It is therefore an object of the invention to securely determine the position of a sprocket hole also when the sprocket hole is damaged or dirty.

This object is solved in that an evaluation device is provided to
- determine, in given areas, edge positions in a measuring frame supplied by the scanning device,
- form lines from the determined edge positions, and
- determine the deviation of the center of the sprocket hole from a reference center.

According to the invention, noise influences or errors of the edges are compensated by fanning a line after an edge detection. Lines are herein understand to be curves or straight lines. The center of the scanned sprocket hole can be determined from the detected lines. The center may also be directly computed after the edge detection without determining lines. In this case, symmetry axes are determined whose intersections constitute the center. This center is compared with a reference center from which offset data far correcting the frame position are computed.

The synchronization between the scanning device and the frame sensor is defined. Not only the sprocket hole is scanned but also an area peripheral to the hole so as to detect edges of the hole. The result of this scanning is a measuring frame which is processed by the evaluation circuit.

In order to minimize the computing time in the evaluation circuit, the whole measuring frame is not examined by the evaluation circuit but only four edge position areas are selected to facilitate edge detection when subject to worst case steadiness errors, (extreme vertical and/or horizontal steadiness errors). When determining edge positions, a threshold value test and interpolation are performed. Alternatively, a second derivative of the contrast range can be formed and a subsequent interpolation can be performed to permit the determination of edge positions in the sub-pixel range.

These and other aspects of the invention will be apparent from and elucidated with reference to the embodiments described hereinafter.

Figure 2:
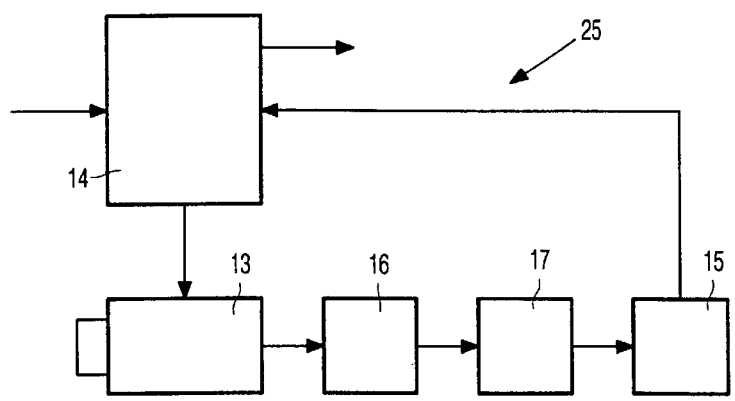
Figure 3:
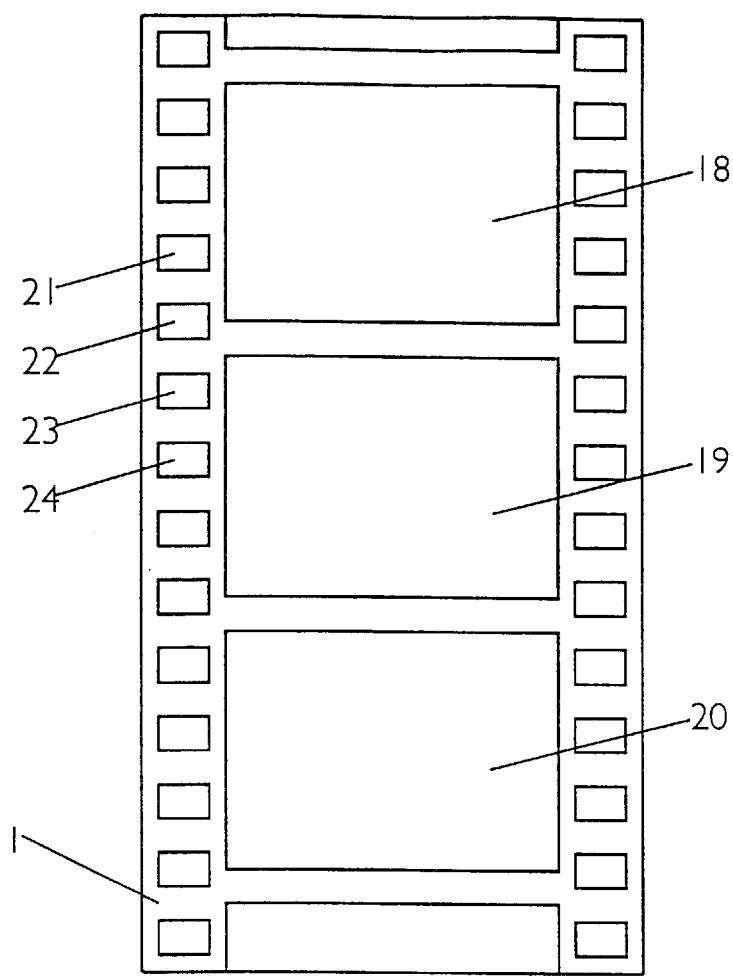
Figure 4:
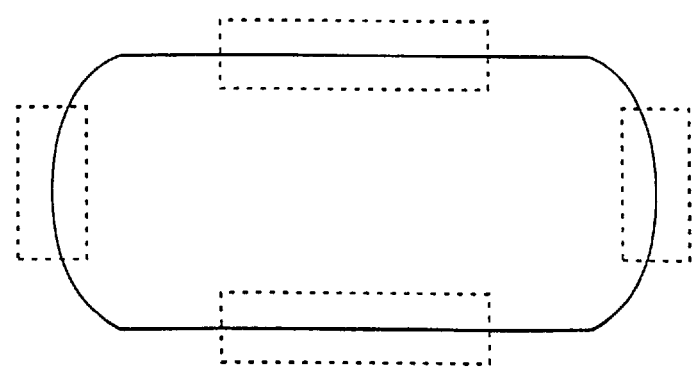
Figure 5:
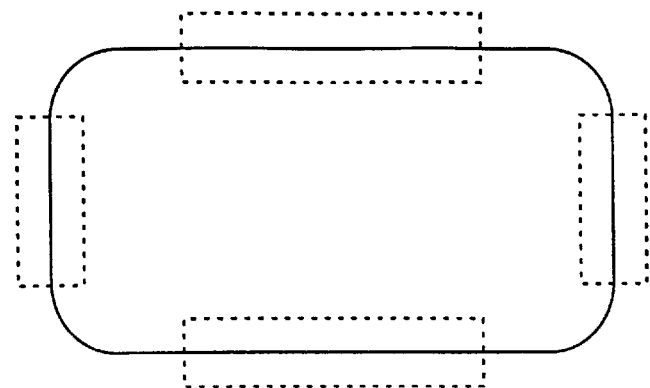
Figure 6:
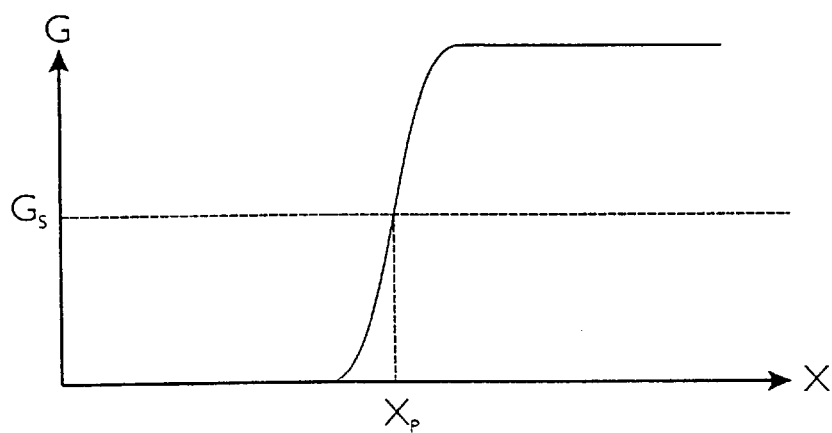
Figure 7:
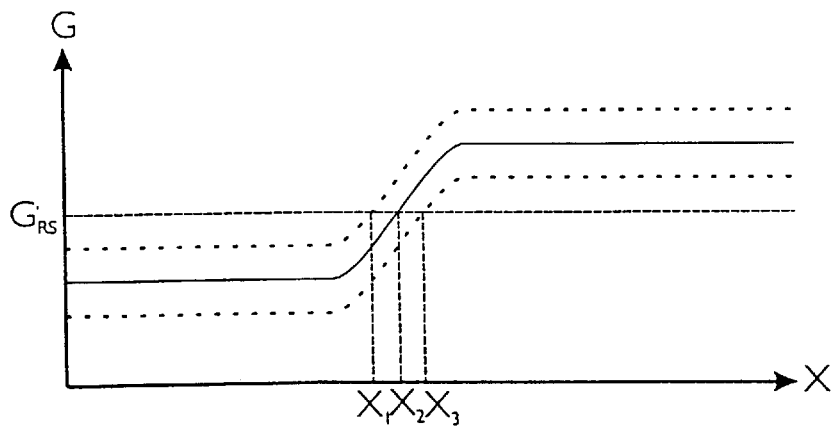
Figure 8:
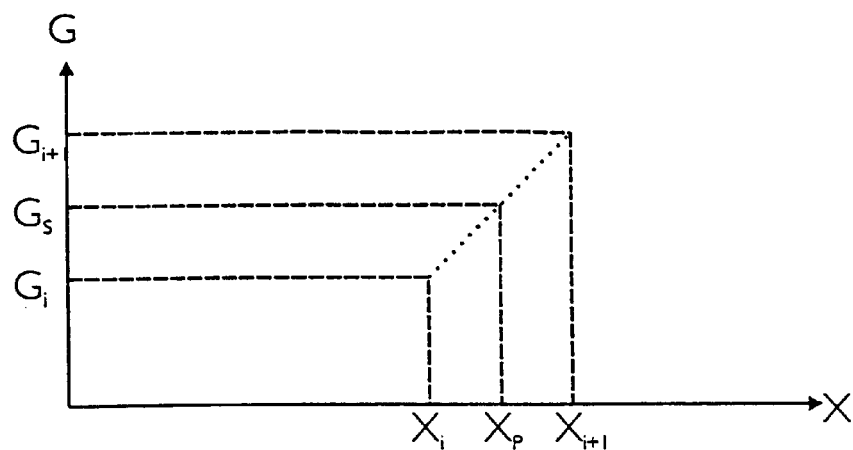
Figure 9:
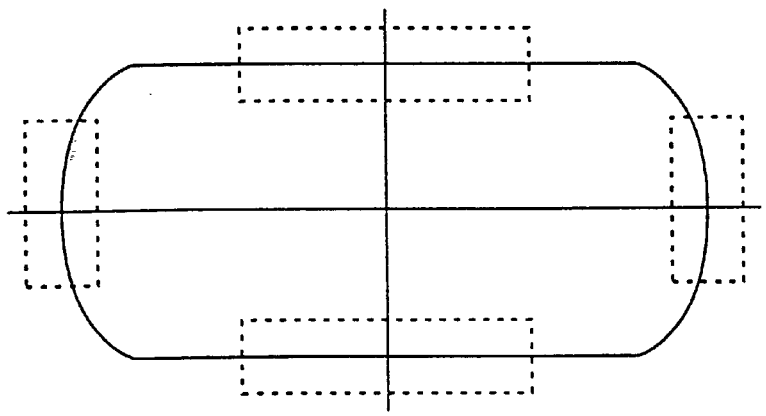
Figure 10:
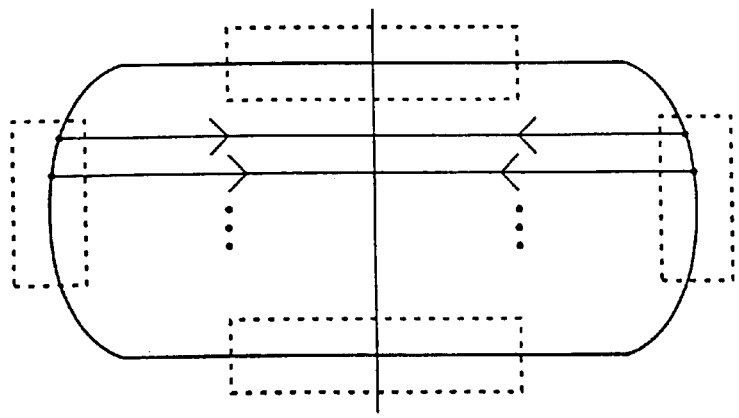

In the drawings:

FIG. 1 shows diagrammatically a film scanner,

FIG. 2 shows an evaluation unit for processing video and measuring data generated in the film scanner, FIG. 3 shows a section of a film to be scanned by the film scanner, FIGS. 4 and 5 show two types of sprocket holes, FIGS. 6 and 7 show examples of grey value levels at an edge, FIG. 8 is a graphic explanation of the linear interpolation, and FIGS. 9 and 10 are graphic explanations of the determination of the center of a sprocket hole.

FIG. 1 shows diagrammatically the structure of a film scanner scanning a film 1 continuously. To this end, the film 1 to be scanned is driven by means of a capstan 2 and passed along an illumination source 3 for illuminating the film frame and a frame sensor 4, with sensors 5 for scanning the illuminated film 1 being present in the frame sensor 4. A film carrier device 6 comprising barrel-shaped guiding elements 7 for guiding the film 1 is arranged between the illumination source 3 and the frame sensor 4. The guiding elements 7 cause the film 1 to be positioned outside the film frames and to glide along a curved path.

In the embodiment shown in FIG. 1, only one of the two sprocket holes required for scanning is scanned so as to correct vertical and horizontal steadiness errors. To illuminate a sprocket hole, infrared light is used in the embodiment, which light images the edges of the sprocket holes with a great contrast. This infrared light is generated by means of an infrared diode 8. The infrared diode 8 is loosely coupled to an optical guide 9 which guides the light of the infrared diode to a recess 10 within the barrel-shaped guiding elements 7. The recess 10 is sealed by means of an optically transparent cover 11 so that the recess 10 is prevented from getting dirty due to dirt caused by film abrasion.

An optical deflection device 12 is arranged above the exit face of the infrared light, which device supplies the image of the respective sprocket hole to a spatially positioned line camera 13. In the embodiment, this optical deflection device 12 consists of an adjustable mirror.

The film frames picked up by the frame sensor 4 are supplied as video data of a signal processing unit 14 (FIG. 2) which electronically corrects vertical and horizontal steadiness errors in dependence upon offset data supplied by a processor 15. The signal-processing unit 14 and the processor 15 are part of the evaluation unit 25 shown in FIG.

2 which further comprises a buffer memory 16 and a ring memory 17 between the line camera 13 and the processor 15. The signal-processing unit 14 applies film speed-dependent control data to the line camera 13 for the purpose of synchronization.

FIG. 3 shows a section of the film 1 with three frames 18, 19 and 20. Each frame has four sprocket holes on the outer sides. The frame 19 has, for example the four sprocket holes 21, 22, 23 and 24 on an outer side. The line camera 13 scans each sprocket hole on an outer side of a frame. The data of a sprocket hole scanned by means of the line camera 13 will hereinafter be referred to as measuring data and the total amount of measuring data associated with a sprocket hole will be referred to as measuring frame. The measuring data of a measuring frame do not only comprise the sprocket hole but also the surroundings of the sprocket hole.

A measuring frame picked up by the line camera 13 is buffered in the buffer memory 16 and written into the ring memory 17 under the control of the signal processing unit 14. The ring memory 17 comprises at least four consecutive measuring frames. Of four consecutive measuring frames, only one measuring frame is required by the processor 15 for computing offset data. For example, the measuring data of the sprocket hole 24 of the frame 19 of the section shown in FIG. 3 are used.

In the processor 15, an edge detection is first performed after the supply of a measuring frame. In given areas, the position of an edge of the measuring frame present as a grey level frame is detected. In principle, two types of sprocket holes can be distinguished, as is shown in FIGS. 4 and 5. The first type of sprocket hole, shown in FIG. 4, is referred to as N hole and is straight at the lower and upper sides and circular at the outer sides. The sprocket hole shown in FIG. 5, which is referred to as P hole, is straight at the lower and upper sides as well as at the outer sides. The corners of the P hole are, however, rounded. To avoid unnecessary extension of the computing time of the processor 15, an edge is searched only in four areas of the measuring frame. These areas are rectangular and cover the central part of the upper and lower sides and the outer sides. The rectangular areas are shown as rectangles in broken lines in FIGS. 4 and 5. Lines, i.e. a straight line or a curve are computed by the processor 15 from the detected data via edge positions of the measuring frame, because the edge positions found usually do not constitute a line owing to the influence of noise or edge errors in the sprocket hole. Subsequently, the processor 15 determines the center of the measuring frame or sprocket hole and compares the position of the center with the stored data of a reference center. The reference center indicates the ideal position of the sprocket hole and hence of the corresponding video image picked up by the frame sensor 4. After computation of the deviation of the center of the measuring frame from the reference sensor, the computed data are applied as offset data to the signal-processing unit 15.

The evaluation unit 25 may be alternatively implemented, for example, as a computer which comprises data from the frame sensor 4 and the line camera 13 and which carries out the functions to be performed by the circuit elements 14, 15, 16 and 17.

The edge detection, line formation and center computation to be performed by the processor 15 will hereinafter be elucidated. As described above, four areas of the measuring frame are examined during edge detection. An edge indicates a locally dependent variation of discontinuity of the grey level values G in the measuring frame.

FIG. 6 shows the profile of an edge in the horizontal direction x. At one edge, the grey value G increases until the maximum grey value is reached. In a simple mode of edge detection, a transition, or conversely, is detected. For this purpose, a threshold value $G_S$ is fixed, by which it is decided whether a grey level is to be considered as bright or dark. If this threshold value is exceeded or falls below the value, there is a change between bright and dark, i.e. an edge at the position $x_p$. FIG. 6 shows this transition in the grey value range G.

A further edge detection mode takes, for example, brightness fluctuations in the frame into account (cf. FIG. 7). In this case, a relative threshold value $G_{RS}$ is used which is determined by measuring the grey level range.

In determining an edge position $X_p$ associated with a threshold value $G_S$ or $G_{RS}$, it rarely occurs that $x_p$ is equal to the position of a pixel. As a rule, an edge lies between two pixels. To determine the edge position $x_p$, an interpolation is performed in accordance with the invention. One method is the linear interpolation method. The searched point $(x_p, G_S)$ is located on the straight line constituted by the pair of points $(x_i, G_i)$ and $(x_{i+1}, G_{i+1})$. The pair of points $(x_i, G_i)$ and $(x_{i+1}, G_{i+1})$ are co-ordinates of two pixels, as is shown in FIG. 8. An edge position results from the formula:

$$x_P = \frac{G_S - G_i}{G_{i+1} - G_i} + x_i$$

The edge position in the sub-pixel range can be determined by means of this formula.

The grey value curve shown in FIG. 6 has a slope at one edge. This slope may also be inverted. The first derivative of such a grey value curve has a peak at one edge and the original grey value curve thus has a turning point. Consequently, the search for an edge may be mathematically denoted as "searching for a turning point". The advantage of such a "turning point search" is that, for example, brightness fluctuations do not have any effect on the derivative. The derivative of a sequence of discrete values is formed by subtraction:

$$G'(x_i) = \frac{G(x_i + 1) - G(x_i)}{x_{i+1} - x_i} = G_{i+1} - G_i$$

In this case, the edge position is also determined to exactly one pixel. For intermediate values, a quadratic interpolation is used. An edge position results from the formula:

$$x_P = \frac{G_{i-1} - G_i}{G_{i+1} - 2G_i + G_{i+1}} + x_i$$

in which $x_{i-1} = x_i - 1$ and $x_{i+1} = x_i + 1$.

The edge positions determined during edge detection are combined to a line in a subsequent step to be described. The sequence of determined edge positions is usually not located on a line (straight line or curve). This is caused by noise influences or edge errors. Therefore, it is necessary in a subsequent step to form a line from the values supplied by the edge detectors. A straight line can be determined by means of linear regression. A straight line and/or curve can also be computed from the determined edge positions by means of the Hough transformation described in, for example the document "Peter Haberäcker: Digitale Bildverarbeitung, 3rd edition, 1989, pp. 344–348".

In a third step, the processor 15 computes the center of the measuring frame from the determined lines. This can be achieved, for example, by means of two different computation methods. In a first method, two symmetry axes are formed from the horizontal and vertical lines. The point of intersection of the symmetry axes is the center of the sprocket holes. This method is shown in FIG. 9. The symmetry axes are computed from the respective horizontal and vertical lines.

In the second method, the edge determination is omitted from the computed edge positions and a line representing a symmetry axis is directly computed (FIG. 10). By means of a linear regression or a Hough transformation, a straight line can be formed from the individual points. This method may be used for the circular edges and for straight edges when they are parallel to one another. The center of the sprocket hole is indicated by the point of intersection of the symmetry axes. As compared with the first-mentioned method, this second method has the advantage that only a linear regression or a Hough transformation for two edges of the sprocket hole is required. This results in a saving of computations and thus also time.

What is claimed is:

1. A film scanner with a frame sensor for scanning frames of a film, and a scanning device for scanning at least a sprocket hole associated with a film frame, comprising:

an evaluation device, operable to determine, in given opposite areas of the sprocket hole, edge positions in a measuring frame supplied by the scanning device, form lines from the determined opposing edge positions to determine a center of the sprocket hole; and, determine a deviation of the center of the sprocket hole from a reference center.

2. A film scanner as claimed in claim 1, wherein
after determining the deviation between the center of the measured sprocket hole and the reference center, the evaluation circuit corrects vertical and horizontal steadiness errors of the film frame picked up by the frame sensor.

3. A film scanner as claimed in claim 1, wherein
the evaluation circuit is provided to apply film speed-dependent control data to the scanning device constituted as a line camera.

4. A film scanner as claimed in claim 1, wherein
the evaluation circuit comprises a buffer memory for buffering a measuring frame which consists of measuring data obtained by scanning a sprocket hole and the surroundings of the sprocket hole by means of the scanning device.

5. A film scanner as claimed in claim 1, wherein
the evaluation circuit determines the edge position in that a threshold value test of the grey level or brightness variation in the measuring frame and a subsequent interpolation are performed.

6. A film scanner, comprising:

a frame sensor for picking up film frames;

a scanning device for scanning at least a sprocket hole associated with a film frame;

an evaluation circuit for determining edge positions in a measuring frame supplied by the scanning device; wherein, the evaluation device forms lines from the determined edge positions, and determines the deviation of a center of the sprocket hole from a reference center;

the evaluation circuit searches for edge positions in four areas of the measuring frame the four areas cover only a part of the measuring frame; and, the measuring frames are chosen to permit detection of edge positions of the four edges when subject to extreme vertical and/or horizontal steadiness errors.

7. A film scanner, comprising:

a frame sensor for picking up film frames;

a scanning device for scanning at least a sprocket hole associated with a film frame;

an evaluation circuit for determining edge positions in a measuring frame supplied by the scanning device; wherein, the evaluation device forms lines from the determined edge positions, and determines the deviation of a center of the sprocket hole from a reference center; and, the evaluation circuit determining the edge position by interpolation of a second derivative of a grey level or brightness signal variation formed in the measuring frame.

8. A film scanner, comprising:

a frame sensor for picking up film frames;

a scanning device for scanning at least a sprocket hole associated with a film frame;

an evaluation circuit for determining edge positions in a measuring frame supplied by the scanning device; wherein, the evaluation device forms lines from the determined edge positions, a line having one of a curve or a straight line;

the evaluation circuit performs one of a linear regression or a Hough transformation on the sequence of determined edge positions associated with an edge; and, the evaluation device determines deviation of a center of the sprocket hole from a reference center.

9. A film scanner, comprising:

a frame sensor for picking up film frames;

a scanning device for scanning at least a sprocket hole associated with a film frame;

an evaluation device for determining edge positions in a measuring frame supplied by the scanning device, wherein determined edge positions of two facing edges form a symmetry axis by means of one of a linear regression or a Hough transformation;

the evaluation device forms lines from the determined edge positions of two facing edges; and, the evaluation device determines a deviation of a center of the sprocket hole from a reference center.

* * * * *